United States Patent
Kurokawa

(10) Patent No.: US 11,165,745 B2
(45) Date of Patent: Nov. 2, 2021

(54) CONTROL SYSTEM, CONTROLLER, AND CONTROL METHOD

(71) Applicant: OMRON Corporation, Kyoto (JP)

(72) Inventor: Yoichi Kurokawa, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/643,843

(22) PCT Filed: Jan. 28, 2019

(86) PCT No.: PCT/JP2019/002733
§ 371 (c)(1),
(2) Date: Mar. 2, 2020

(87) PCT Pub. No.: WO2019/176335
PCT Pub. Date: Sep. 19, 2019

(65) Prior Publication Data
US 2021/0067483 A1 Mar. 4, 2021

(30) Foreign Application Priority Data

Mar. 12, 2018 (JP) .............................. JP2018-043839

(51) Int. Cl.
*H04L 29/12* (2006.01)
*G16Y 40/30* (2020.01)
(52) U.S. Cl.
CPC .......... *H04L 61/2007* (2013.01); *G16Y 40/30* (2020.01)
(58) Field of Classification Search
CPC ............................ G16Y 40/40; H04L 61/2007
See application file for complete search history.

(56) References Cited

U.S. PATENT DOCUMENTS

2005/0228517 A1 10/2005 Tomita
2008/0285575 A1* 11/2008 Biswas ............... H04L 41/0246
370/401

(Continued)

FOREIGN PATENT DOCUMENTS

JP 2000-137508 A 5/2000
JP 2002-108731 A 4/2002

(Continued)

OTHER PUBLICATIONS

English translation of the International Search Report("ISR") of PCT/JP2019/002733 dated Apr. 16, 2019.
Written Opinion("WO") of PCT/JP2019/002733 dated Apr. 16, 2019.

*Primary Examiner* — Tonia L Dollinger
*Assistant Examiner* — Jihad K Boustany
(74) *Attorney, Agent, or Firm* — Metrolex IP Law Group, PLLC

(57) ABSTRACT

There is provided a technique for attaining a state in which communication can be made even when the same control program is used in controllers. Each of the controllers includes: a network setting including a corresponding relation between an IP address and an identifier; and a storage device that stores a control program for controlling a drive device. The control program includes a control instruction for controlling the drive device with the identifier being an input. Each of the controller includes: a generation module that generates an IP address to be different from an IP address of another controller on the same network, and that rewrites the IP address in the network setting; and a communication module that communicates with an information processing device on the same network in accordance with the IP address in the network setting.

9 Claims, 14 Drawing Sheets

(56) References Cited

U.S. PATENT DOCUMENTS

| | | | | |
|---|---|---|---|---|
| 2010/0142410 | A1* | 6/2010 | Huynh Van | H04L 12/4641 |
| | | | | 370/255 |
| 2013/0315246 | A1* | 11/2013 | Zhang | H04L 12/56 |
| | | | | 370/392 |
| 2016/0173441 | A1* | 6/2016 | Lee | H04L 61/2092 |
| | | | | 709/220 |
| 2017/0248932 | A1* | 8/2017 | Takeuchi | G05B 19/054 |
| 2021/0083671 | A1* | 3/2021 | Allory | G21D 3/00 |

FOREIGN PATENT DOCUMENTS

| | | | |
|---|---|---|---|
| JP | 2002-328706 | A | 11/2002 |
| JP | 2004-302735 | A | 10/2004 |
| JP | 2008-152799 | A | 7/2008 |
| JP | 2013-242629 | A | 12/2013 |
| JP | 2017-151934 | A | 8/2017 |

* cited by examiner

FIG.4
(A)
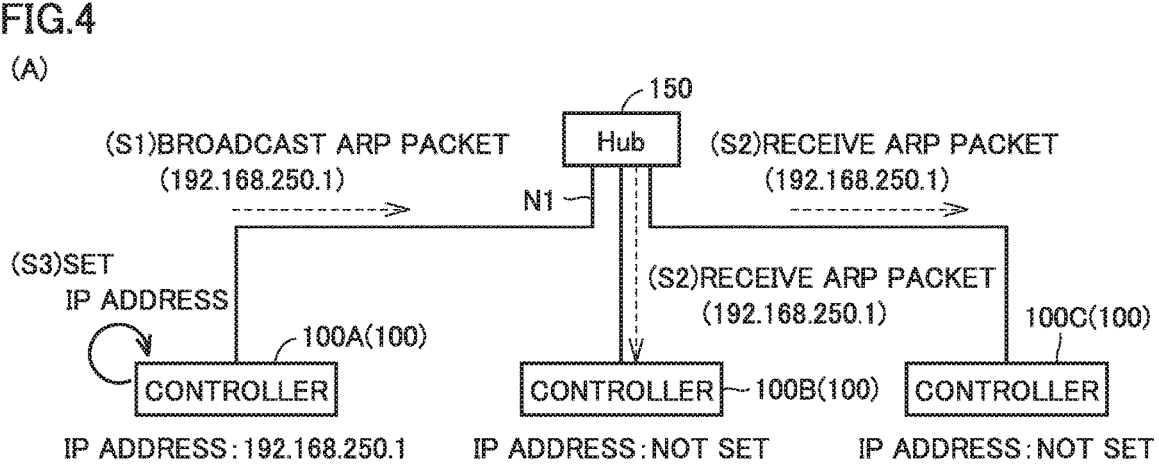
(B)
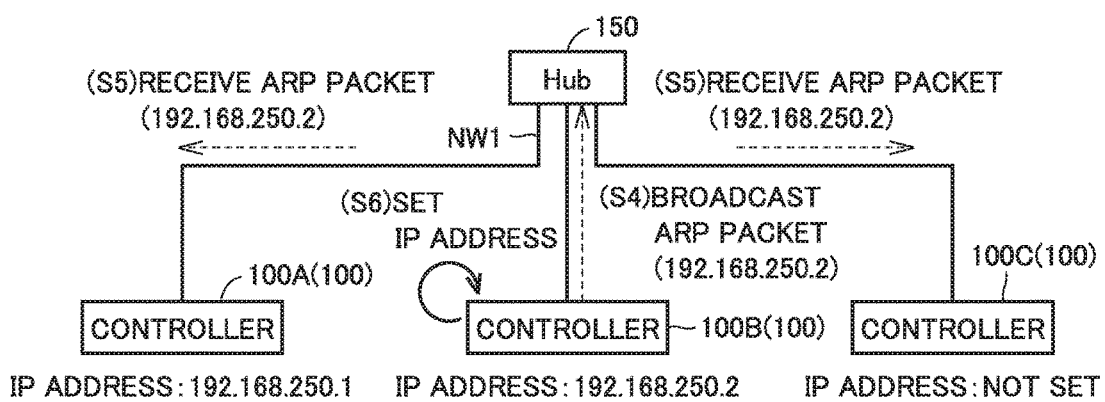
(C)
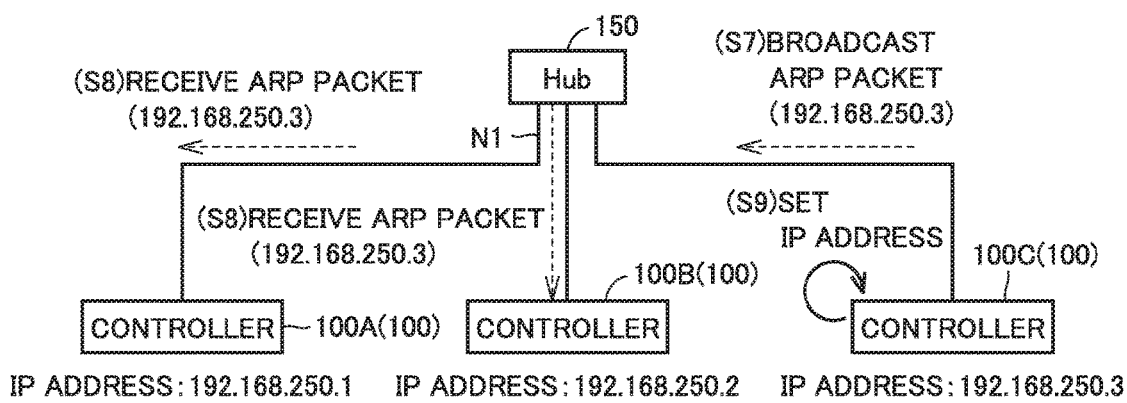

| IDENTIFICATION INFORMATION OF CONTROLLER | IP ADDRESS | SERIAL No | MODEL NUMBER |
|---|---|---|---|
| CONTROLLER 100A | 192.168.250.1 | 0x12345678 | NJ501-1500 |
| CONTROLLER 100B | 192.168.250.2 | 0x23456789 | NJ701-1700 |
| CONTROLLER 100C | 192.168.250.3 | 0x34567890 | NJ301-1200 |

CONTROL SYSTEM, CONTROLLER, AND CONTROL METHOD

TECHNICAL FIELD

The present disclosure relates to a technique for automatically setting an IP (Internet Protocol) address to a control device.

BACKGROUND ART

In various production sites, industrial control devices (hereinafter, also referred to as "controllers") have been introduced, such as PLCs (Programmable Logic Controllers) and robot controllers. Each of such controllers controls various industrial drive devices, thus automating a production process.

A plurality of controllers may be connected to the same network. These controllers are configured to communicate with a high-level information processing device. The high-level information processing device can communicate with each controller to collect information on a drive device controlled by the controller and information on the controller. For such communication between the information processing device and each of the controllers, it is necessary to perform network settings (for example, IP addresses) for the controllers.

Exemplary documents about network settings for controllers are Japanese Patent Laying-Open No. 2013-242629 (Patent Literature 1), Japanese Patent Laying-Open No. 2008-152799 (Patent Literature 2), Japanese Patent Laying-Open No. 2017-151934 (Patent Literature 3), and Japanese Patent Laying-Open No. 2002-328706 (Patent Literature 4).

CITATION LIST

Patent Literature

PTL 1: Japanese Patent Laying-Open No. 2013-242629
PTL 2: Japanese Patent Laying-Open No. 2008-152799
PTL 3: Japanese Patent Laying-Open No. 2017-151934
PTL 4: Japanese Patent Laying-Open No. 2002-328706

SUMMARY OF INVENTION

Technical Problem

In some cases, when scaling up facilities in a production site, there is a need to duplicate a current facility. In this case, a drive device control program downloaded to a controller is used also in another controller.

In the case where such a control program controls a drive device depending on the IP address of the controller, when the control program is duplicated, the IP addresses of the controllers become the same, with the result that the control program is not operated normally. Moreover, network settings thereof become the same, with the result that a high-level information processing device becomes unable to communicate with each controller. In order to solve these problems, the network settings and description of the control program need to be changed manually. However, such a change requires more time and effort as the scale of the facility is larger.

The present disclosure has been made to solve the above-described problems, and an object in a certain aspect thereof is to provide a technique for attaining a state in which communication can be made even when the same control program is used in controllers.

Solution to Problem

In one example of the present disclosure, a control system includes: a plurality of controllers that each control a drive device serving as a control target; and an information processing device connected to the same network as a network to which each of the plurality of controllers is connected. Each of the plurality of controllers includes a storage device that stores a network setting and a control program for controlling the drive device serving as the control target, the network setting including a corresponding relation between an IP (Internet Protocol) address of the controller and an identifier serving as an alternative to the IP address. The control program includes a control instruction for controlling the drive device serving as the control target with the identifier indicated in the network setting of the controller being an input. Each of the plurality of controllers further includes: a generation module that generates an IP address of the controller to be different from an IP address of an other controller and that rewrites, with the generated IP address, the IP address indicated in the network setting of the controller; and a communication module that communicates with the information processing device in accordance with the IP address indicated in the network setting of the controller.

According to the present disclosure, even when the same control program is used in the controllers, the control system can attain a state in which the information processing device and each controller can communicate with each other.

In one example of the present disclosure, the generation module generates the IP address of the controller based on identification information that is able to uniquely identify the controller.

According to the present disclosure, the controller can securely generate an IP address that is not the same as the IP address of the other controller.

In one example of the present disclosure, each of the plurality of controllers is connectable to an external storage medium. The external storage medium stores a setting value about an IP address. The generation module reads the setting value stored in the external storage medium, and generates the IP address of the controller in accordance with the setting value.

According to the present disclosure, the user can change the IP address of the controller only by rewriting the setting value stored in the external storage medium.

In one example of the present disclosure, the generation module makes an inquiry to the other controller about whether or not the generated IP address is already used by the other controller, and when there is no other controller that makes a response to the inquiry, the generation module rewrites the IP address indicated in the network setting of the controller with the generated IP address.

According to the present disclosure, the controller can securely generate an IP address that is not the same as the IP address of the other controller.

In one example of the present disclosure, when there is any other controller that makes a response to the inquiry, the generation module regenerates an IP address different from the IP address generated previously.

According to the present disclosure, the IP address of the controller can be avoided from being the same as the IP address of the other controller.

In one example of the present disclosure, when the other controller makes an inquiry about whether or not the IP address of the other controller is already set in the controller, the generation module generates the IP address of the controller so as not to be the same as the IP address of the other controller.

According to the present disclosure, the controller can generate a unique IP address more securely than in the case where an IP address is generated randomly.

In one example of the present disclosure, the control program stored in the controller is a duplicate of a control program stored in an other controller.

According to the present disclosure, even when the control program in the other controller is a duplicate of the control program in the controller, the control system can attain a state in which the information processing device and each controller can communicate with each other.

In another example of the present disclosure, a controller for controlling a drive device includes a storage device that stores a network setting and a control program for controlling the drive device, the network setting including a corresponding relation between an IP address of the controller and an identifier serving as an alternative to the IP address. The control program includes a control instruction for controlling the drive device with the identifier indicated in the network setting being an input. The controller further includes: a generation module that generates an IP address of the controller to be different from an IP address of an other controller connected to the same network as a network to which the controller is connected and that rewrites, with the generated IP address, the IP address indicated in the network setting; and a communication module that communicates, in accordance with the IP address indicated in the network setting, with an information processing device connected to the same network as the network to which the controller is connected.

According to the present disclosure, even when the same control program is used in the controllers, the control system can attain a state in which the information processing device and each controller can communicate with each other.

In another example of the present disclosure, a method for controlling a controller for controlling a drive device includes: obtaining, from a storage device of the controller, a network setting and a control program for controlling the drive device, the network setting including a corresponding relation between an IP address of the controller and an identifier serving as an alternative to the IP address. The control program includes a control instruction for controlling the drive device with the identifier indicated in the network setting being an input. The method further includes: generating an IP address of the controller to be different from an IP address of an other controller connected to the same network as a network to which the controller is connected, and rewriting, with the generated IP address, the IP address indicated in the network setting; and communicating, in accordance with the IP address indicated in the network setting, with an information processing device connected to the same network as the network to which the controller is connected.

According to the present disclosure, even when the same control program is used in the controllers, the control system can attain a state in which the information processing device and each controller can communicate with each other.

BRIEF DESCRIPTION OF DRAWINGS

FIG. 4 shows a course of process in which each controller generates its own IP address.

FIG. 9 shows an exemplary IP address management table.

DESCRIPTION OF EMBODIMENTS

Figure 1:
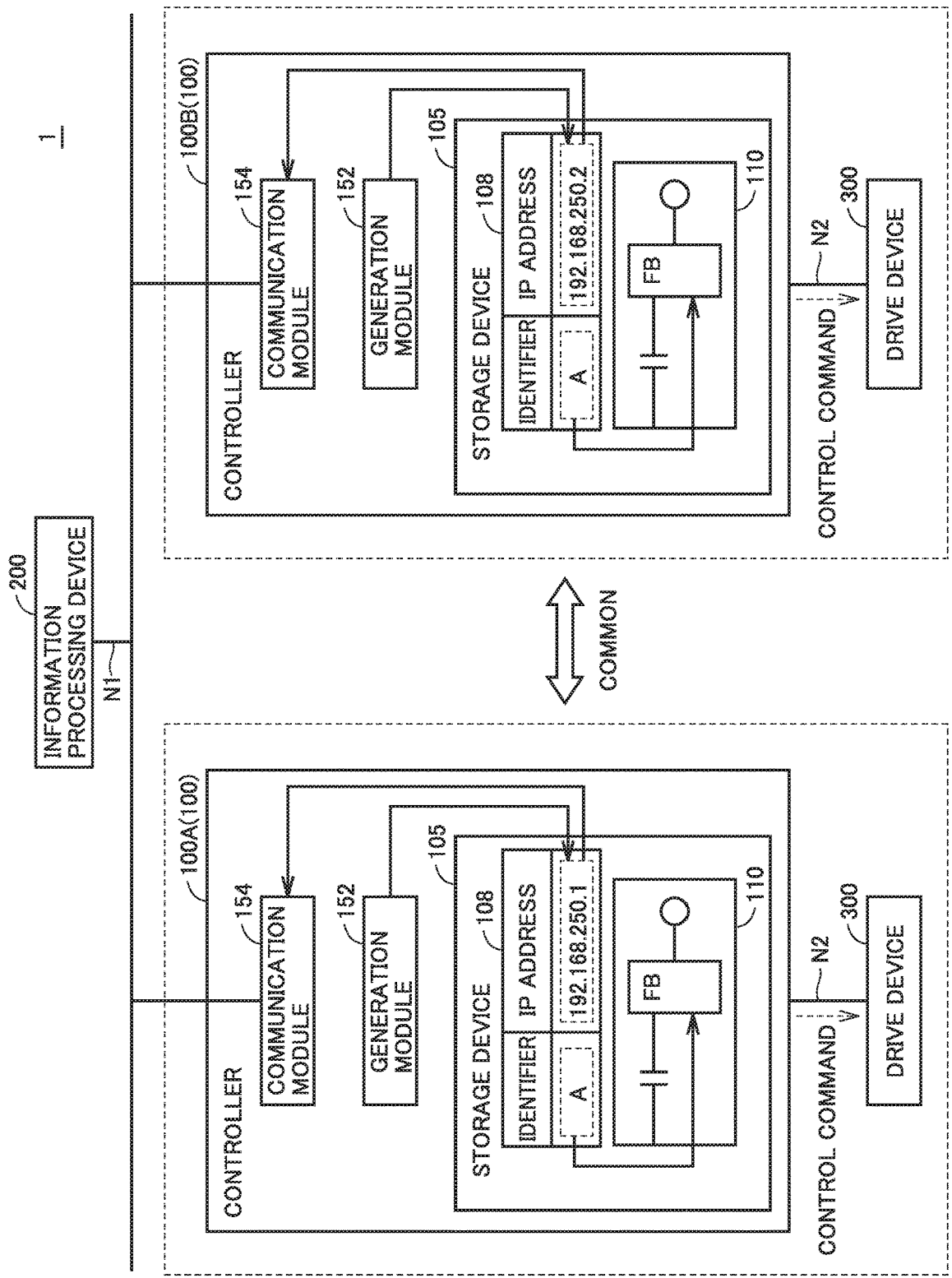
FIG. 1 shows an overview of a control system according to an embodiment.

The following describes embodiments of the present invention with reference to figures. In the description below, the same reference characters are given to the same parts and components. Their names and functions are also the same. Hence, they are not described in detail repeatedly.

A. Implementation

An implementation of the present invention will be described with reference to FIG. 1. FIG. 1 shows an overview of a control system 1.

Control system 1 is an FA (Factory Automation) system for controlling a control target such as a facility or a device to automate a production process. Control system 1 includes a plurality of controllers, one or more information processing devices 200, and a plurality of drive devices. As an example of the plurality of controllers, two controllers 100A, 100B are shown in FIG. 1. Moreover, as an example of the plurality of drive devices, two drive devices 300 are shown.

Each of controllers 100A, 100B includes a storage device 105, a generation module 152, and a communication module 154. In the description below, the plurality of controllers (for example, controllers 100A, 100B) will be also collectively referred to as "controllers 100".

Each of controllers 100 is connectable to a plurality of networks. In the example of FIG. 1, controller 100 is connected to a network N1 and a network N2.

For network N1, EtherNET (registered trademark) is employed, for example. However, network N1 is not limited to EtherNET, and any communication means can be employed. In the example of FIG. 1, information processing device 200 is connected to network N1. Examples of information processing device 200 include a PC (Personal Computer), a tablet terminal, a smartphone, an indicator (for example, HMI (Human Machine Interface)), and the like.

Network N2 is a lower-level network than network N1. For network N2, EtherNet/IP (registered trademark) or the like is employed, for example. In the example of FIG. 1, drive device 300 is connected to network N2. Drive device 300 includes various industrial devices for automating a production process. As an example, drive device 300 includes: an arm robot; a robot controller for controlling the arm robot; an image sensor for capturing an image of a workpiece conveyed during the production process; other devices used in the production process; and the like.

Storage device 105 stores: a network setting 108 of controller 100; and a control program 110 for controlling drive device 300.

Network setting 108 includes a corresponding relation between an IP address of controller 100 and an identifier serving as an alternative to the IP address. The identifier may be a program variable defined in control program 110, may be a system variable managed by controller 100, or may be a physical address indicating a location in which each variable is stored.

Control program 110 is a user program implemented for drive device 300 by a designer. A development tool for control program 110 is installed in information processing device 200 that is a PC, for example. The designer can design control program 110 suited to a configuration of drive device 300 by appropriately combining a plurality of types of previously defined instructions on the development tool. Control program 110, which is compiled on the development tool, is installed in controller 100.

Typically, control program 110 of controller 100A is a duplicate of control program 110 of controller 100B. Control system 1 according to the present embodiment provides an environment that allows controller 100 to be operated without changing description of the control program or a setting about the IP address even when the control program is duplicated.

More specifically, control program 110 includes a control instruction for controlling drive device 300 serving as a control target with the identifier indicated in network setting 108 of controller 100 being an input. The identifier is the same between controllers 100A, 100B. As described above, the identifier serves as an alternative to the IP address of each of controllers 100A, 100B. The identifier is a fixed value that is not tied to the IP address of each of controllers 100A, 100B. By interpreting the IP address with such an identifier being an input, the user does not need to rewrite control program 110 even when the IP address is changed.

Generation module 152 generates the IP address of the controller to be different from an IP address of another controller. That is, generation module 152 generates the IP address of the controller so as to avoid the IP addresses of controllers 100A, 100B from being the same. Details of a method for generating an IP address so as not to be the same will be described later. Generation module 152 rewrites, with the generated IP address, the IP address indicated in network setting 108 of the controller.

Communication module 154 communicates with information processing device 200 in accordance with the IP address indicated in network setting 108 of the controller. Since the IP address indicated in network setting 108 is determined not to be the same as the IP address of the other controller, information processing device 200 can communicate with controllers 100A, 100B.

As described above, in accordance with the identifier serving as an alternative to the IP address, the control instruction depending on the IP address and included in control program 110 controls drive device 300 serving as a control target. Hence, even when the IP address is changed, the description of control program 110 does not need to be changed. As a result, the currently used control program can be also used in the other controller.

Moreover, each of controllers 100A, 100B has a function of generating an IP address so as not to be the same as that of the other controller. Hence, even when a larger number of controllers are connected to network N1, information processing device 200 can continue communication with each of the controllers. This makes it possible to attain a state in which communication can be made even when a control program in a certain controller is used in another controller connected to the same network. Accordingly, when duplicating the current facility, the setting about the IP address and the description of the control program do not need to be changed manually.

Such an advantage is more remarkable as the scale of the facility is larger.

B. Device Configuration of Control System 1

Figure 2:
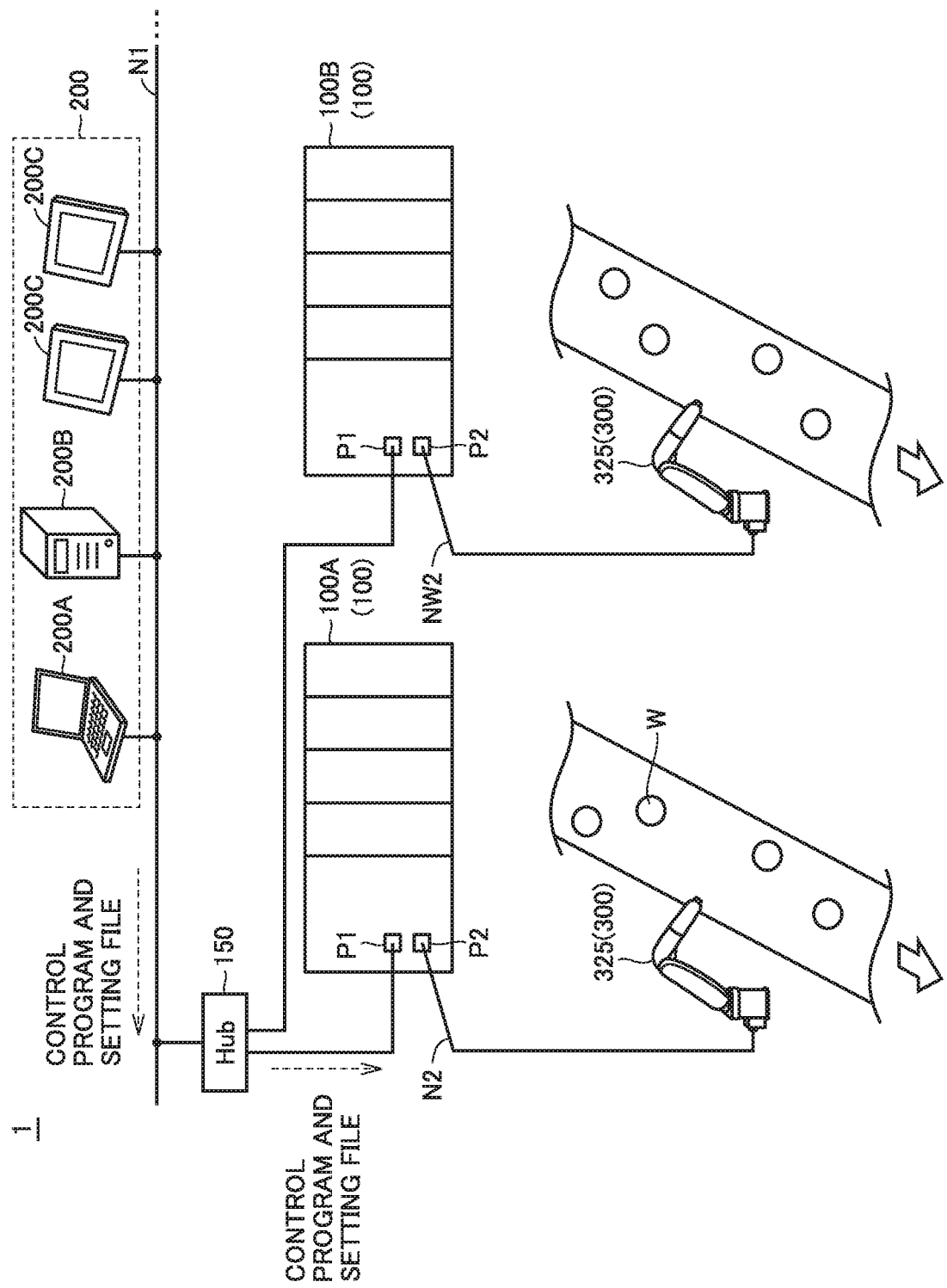
FIG. 2 shows a system configuration of the control system according to the embodiment.

Next, the following describes an entire configuration of control system 1 according to the present embodiment. FIG. 2 shows a system configuration of control system 1 according to the present embodiment.

As shown in FIG. 2, control system 1 includes the plurality of controllers 100, one or more information processing devices 200, and the plurality of drive devices 300.

Each of controllers 100 is connectable to a plurality of networks. In the example of FIG. 2, controller 100 is connected to high-level network N1 and low-level network N2.

Information processing device 200 is connected to high-level network N1. Information processing device 200 is a communication device connectable to network N1. As shown in FIG. 2, information processing device 200 is constituted of at least one of one or more support devices 200A, one or more server devices 200B, and one or more indicators 200C.

Support device 200A provides a designer with a development environment for designing control program 110. Support device 200A is a notebook PC, a desktop PC, a tablet terminal, a smartphone, or the like, for example. The designer can design control program 110 on support device 200A, and can download control program 110 to controller 100 through network N1.

For server device 200B, a database system, a manufacturing execution system (MES), or the like is considered. The manufacturing execution system obtains information from a manufacturing apparatus or facility serving as a control target, and monitors and manages the entire production. The manufacturing execution system can handle order information, quality information, shipment information, or the like. The configuration is not limited to these. A device that provides an information-related service (a process for obtaining various types of information from a control target and performing a macroscopic or microscopic analysis or the like) may be connected to network N1. Moreover, server device 200B collects, from controller 100, data about an operation state of controller 100 or drive device 300, and writes the collected data in a database.

In response to reception of a manipulation from the user, indicator 200C outputs, to controller 100, a command or the like corresponding to the manipulation of the user. Indicator 200C graphically presents a result of calculation in controller 100 or the like.

Drive device 300 is connected to low-level network N2. Drive device 300 is a collection of devices for performing predetermined operations onto a workpiece W directly or indirectly. FIG. 2 shows arm robot 325, which is an exemplary drive device 300. The facility including controller 100A and arm robot 325 is identical to the facility including controller 100B and arm robot 325.

Controller 100 has a plurality of physical communication ports. Different networks can be connected to respective communication ports. In the example of FIG. 2, controller 100 has two communication ports P1, P2. Network N1 is branched by a hub 150, and is connected to communication port P1 of each of controllers 100A, 100B. Network N2 is connected to communication port P2. For network N2, it is preferable to employ a field network that performs constant-cycle communication to ensure a time of arrival of data. As the field network that performs such constant-cycle communication, EtherCAT, CompoNet, or the like has been known. In accordance with control program 110 (see FIG. 1), controller 100 generates a control command for arm robot 325 at a constant cycle, and sends the control command to arm robot 325.

C. IP Address Automatic Generation Function

As described above, each of controllers 100 generates its own IP address so as not to be the same as the other IP address of the other controller. For such an IP address generation function, various methods can be employed. The following describes specific examples of the IP address automatic generation function.

C1. Specific Example 1 of IP Address Automatic Generation Function

Figure 3:
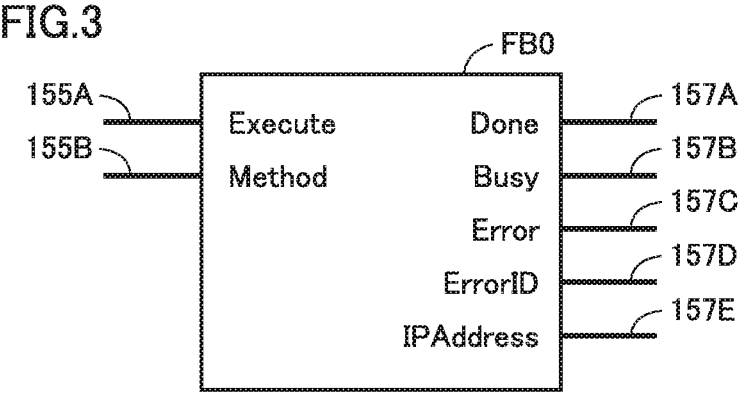
FIG. 3 shows a function block having an IP address automatic generation function.

First, with reference to FIG. 3, a specific example 1 of the IP address automatic generation function will be described. In this specific example, the IP address automatic generation function is provided as a function block. Since such a function block is included in control program 110 (see FIG. 1) described above, the user does not need to set an IP address. FIG. 3 shows a function block FB0 having the IP address automatic generation function. Function block FB0 is one example of generation module 152 (see FIG. 1) described above.

In the description below, it is assumed that the IP address automatic generation function is defined by the function block; however, the IP address automatic generation function may be defined by a different programming language. As an example, the IP address automatic generation function may be defined by a ladder diagram (LD), or may be defined by one or a combination of an instruction list (IL), a structured text (ST), and a sequential function chart (SFC). Alternatively, the IP address automatic generation function may be defined by a general-purpose programming language such as JavaScript (registered trademark) or C language.

As shown in FIG. 3, function block FB0 includes: input portions 155A, 155B each for receiving a setting about the IP address automatic generation function; and output portions 157A to 157E each for outputting a result of execution of the IP address automatic generation function.

Input portion 155A, which is shown as "Execute", receives a setting for designating whether to perform the IP address automatic generation function. As an example, input portion 155A receives an input "True" or "False". The IP address automatic generation function is not performed as long as "False" is input into input portion 155A. On the other hand, when "True" is input into input portion 155A, the IP address automatic generation function is performed.

Input portion 155B, which is shown as "Method", receives a setting about an IP address automatic generation method. That is, function block FB0 switches between IP address automatic generation function methods in accordance with a value input into input portion 155B. As an example, input portion 155B receives inputs of "1" to "3".

When "1" is input into input portion 155B, function block FB0 generates an IP address based on a predetermined setting value stored in an external storage device such as a memory card. Typically, a setting file is written in the external storage device in advance. A setting value about an IP address is defined in the setting file. The setting value may be an IP address itself, or may be identification information specific to the controller (for example, MAC (Media Access Control), a serial number, or the like). Based on "True" being input into input portion 155A shown as "Execute", function block FB0 reads the setting value from the setting file stored in the external storage device. Next, function block FB0 generates an IP address of controller 100 based on the setting value. By providing such an IP address generation method, the user does not need to rewrite existing control program 110.

When "2" is input into input portion 155B, function block FB0 generates an IP address of the controller based on identification information that is able to uniquely identify the controller. The identification information is the MAC (Media Access Control) address of controller 100, for example. Since the IP address of the controller is generated based on such identification information, the IP address of the controller can be determined uniquely.

When "3" is input into input portion 155B, function block FB0 generates the IP address of the controller based on identification information that is able to uniquely identify the controller. The identification information is the serial number of controller 100, for example. Since the IP address of the controller is generated based on such identification information, the IP address of the controller can be determined uniquely.

When the IP address is generated normally, a signal indicating normal termination is output from output portion 157A shown as "Done". During the generation of the IP address, a signal indicating that the generation process is being performed is output from output portion 157B shown as "Busy". When the IP address is not generated normally, a signal indicating abnormal termination is output from output portion 157C shown as "Error". In this case, an error ID for identifying details of the error is also output from output portion 157D shown as "ErrorID". When the IP address is generated normally, the generated IP address is output from output portion 157C shown as "IPAddress".

It should be noted that function block FB0 may be provided with various input portions and output portions in addition to input portions 155A, 155B and output portions 157A to 157E.

C2. Specific Example 2 of IP Address Automatic Generation Function

Next, with reference to FIG. 4, a specific example 2 of the IP address automatic generation function will be described. In this specific example, the IP address automatic generation function is not provided as a function block, but is provided as a basic function of controller 100. The basic function is one example of generation module 152 (see FIG. 1) described above.

FIG. 4 shows a course of process in which each controller generates its own IP address. Three controllers 100A to 100C are shown in FIG. 4. Controllers 100A to 100C are connected to the same network NW1 via hub 150. It is assumed that as an initial state, no IP address is set in each of controllers 100A to 100C.

First, it is assumed that generation module 152 of controller 100A generates an IP address of controller 100A. In the present stage in which no IP addresses of controllers 100A to 100C are set, controller 100A generates an IP address of controller 100A based on identification information that is able to uniquely identify controller 100A, for example. The identification information includes at least one of the MAC address and the serial number, for example. Since the IP address of the controller is generated based on such identification information, the IP address of the controller can be generated uniquely. In the example of FIG. 4, "192.168.250.1" is generated as the IP address of controller 100A.

In a step S1, controller 100A broadcasts the generated IP address to other controllers 100B, 100C. The generated IP address is transmitted by way of an ARP (Address Resolution Protocol) packet, for example. ARP is a scheme for obtaining information on a MAC address of Ethernet from an IP address. Occurrence of a response to the ARP packet indicates that the IP address included in the ARP packet is already used.

By using this scheme, generation module 152 of controller 100A makes an inquiry to the other controllers about whether or not the generated IP address is already used by the other controllers. That is, generation module 152 of controller 100A writes the generated IP address in the ARP packet, and broadcasts the ARP packet to other controllers 100B, 100C.

In a step S2, it is assumed that each of other controllers 100B, 100C receives, from controller 100A, the inquiry made by way of the ARP packet. On this occasion, each of controllers 100B, 100C stores the IP address included in the ARP packet. Each of controllers 100B, 100C determines whether or not the IP address included in the ARP packet coincides with the IP address thereof. When it is determined that the IP address included in the ARP packet coincides with the IP address thereof, each of controllers 100B, 100C transmits its own MAC address to controller 100A that is the origin of transmission of the inquiry. Otherwise, each of controllers 100B, 100C does not transmit anything to controller 100A that is the origin of transmission of the inquiry.

In a step S3, when there is no other controller that makes a response to the inquiry made by way of the ARP packet, generation module 152 of controller 100A rewrites network setting 108 (see FIG. 1) of controller 100A with the generated IP address. Accordingly, controller 100A can securely generate a unique IP address.

On the other hand, when there is any other controller that makes a response to the inquiry made by way of the ARP packet, generation module 152 of controller 100A regenerates an IP address different from the IP address generated previously. Accordingly, the IP address of controller 100A can be avoided from being the same as those of the other controllers. Until no response to the inquiry made by way of the ARP packet is made, controller 100A repeats regeneration of an IP address and an inquiry by way of an ARP packet.

Next, generation module 152 of controller 100B generates an IP address of controller 100B. In the present stage in which the inquiry made by way of an ARP packet is received from other controller 100A, generation module 152 of controller 100B generates an IP address of controller 100B so as not to be the same as the IP address included in the inquiry. Accordingly, controller 100B can generate a unique IP address more securely than in the case where an IP address is generated randomly.

As an example, controller 100B adds a predetermined value (for example, 1) to the IP address, and employs the result of addition as the IP address of controller 100B. In the example of FIG. 4, "192.168.250.2" is generated as the IP address of controller 100B. In a step S4, controller 100B writes the generated IP address in an ARP packet, and broadcasts the ARP packet to other controllers 100A, 100C.

In a step S5, it is assumed that each of other controllers 100A, 100C receives, from controller 100B, the inquiry made by way of the ARP packet. On this occasion, each of controllers 100A, 100C stores the IP address included in the ARP packet. Each of controllers 100A, 100C determines whether or not the IP address included in the ARP packet coincides with the IP address thereof. When it is determined that the IP address included in the ARP packet coincides with the IP address thereof, each of controllers 100A, 100C transmits its own MAC address to controller 100B that is the origin of transmission of the inquiry. Otherwise, each of controllers 100A, 100C does not transmit anything to controller 100B that is the origin of transmission of the inquiry.

In a step S6, when there is no other controller that makes a response to the inquiry made by way of the ARP packet, generation module 152 of controller 100B rewrites network setting 108 (see FIG. 1) of controller 100B with the generated IP address.

On the other hand, when there is any other controller that makes a response to the inquiry made by way of the ARP packet, generation module 152 of controller 100B regenerates an IP address different from the IP address generated previously. Accordingly, the IP address of controller 100B can be avoided from being the same as those of the other controllers. Until no response to the inquiry made by way of the ARP packet is made, controller 100B repeats regeneration of an IP address and an inquiry by way of an ARP packet.

Next, generation module 152 of controller 100C generates an IP address of controller 100C. In the present stage in which the inquiry made by way of an ARP packet is received from each of other controllers 100A, 100B, generation module 152 of controller 100C generates an IP address of controller 100C so as not to be the same as the IP address included in the inquiry.

As an example, controller 100C adds a predetermined value (for example, 1) to the IP address, and employs the result of addition as the IP address of controller 100C. In the example of FIG. 4, "192.168.250.3" is generated as the IP address of controller 100C. In a step S7, generation module 152 of controller 100C writes the generated IP address in an ARP packet, and broadcasts the ARP packet to other controllers 100A, 100B.

In a step S8, it is assumed that each of other controllers 100A, 100B receives, from controller 100C, the inquiry made by way of the ARP packet. Each of controllers 100A, 100B determines whether or not the IP address included in the ARP packet coincides with the IP address thereof. When it is determined that the IP address included in the ARP packet coincides with the IP address thereof, each of controllers 100A, 100B transmits its own MAC address to controller 100C that is the origin of transmission of the inquiry. Otherwise, each of controllers 100A, 100B does not transmit anything to controller 100C that is the origin of transmission of the inquiry.

In a step S9, when there is no other controller that makes a response to the inquiry made by way of the ARP packet, generation module 152 of controller 100C rewrites network setting 108 (see FIG. 1) of controller 100C with the generated IP address.

On the other hand, when there is any other controller that makes a response to the inquiry made by way of the ARP packet, generation module 152 of controller 100C regenerates an IP address different from the IP address generated previously. Accordingly, the IP address of controller 100C can be avoided from being the same as those of the other controllers. Until no response to the inquiry made by way of the ARP packet is made, controller 100C repeats regeneration of an IP address and an inquiry by way of an ARP packet.

As described above, in this specific example, each of controllers 100 determines whether or not the generated IP address is used by the other controllers based on the result of the inquiry made by way of the ARP packet. In a stage in which an inquiry made by way of an ARP packet is received at least once from another controller, controller 100 generates an IP address so as not to be the same as the IP address included in the ARP packet received from the other controller. Accordingly, the IP addresses of the controllers are prevented from being the same.

Preferably, an interval of transmission of an ARP packet is shifted among the controllers. For example, each controller generates a random number, and determines a timing of transmission of an ARP packet based on the random number. Thus, by shifting the timings of transmission of ARP packets among the controllers, the ARP packets are prevented from being transmitted simultaneously.

D. Exemplary Program

Figure 5:
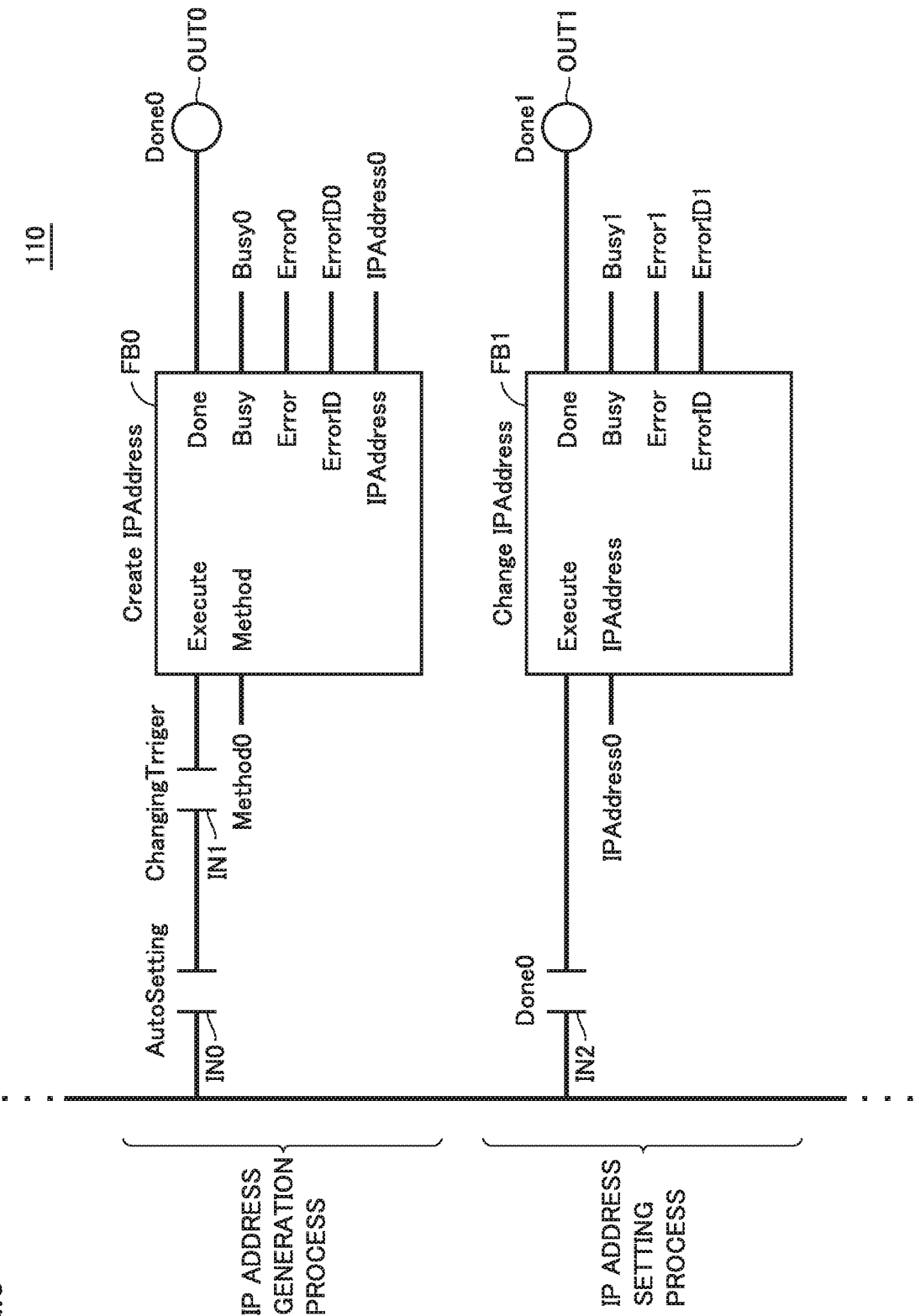
FIG. 5 shows an exemplary control program including the function block shown in FIG. 3.

With reference to FIG. 5, an exemplary use of function block FB0 described with reference to FIG. 3 will be described. FIG. 5 shows an exemplary control program including function block FB0 shown in FIG. 3.

In the example of FIG. 5, control program 110 is defined by a ladder program. Control program 110 includes: a process for generating an IP address of controller 100; a process for setting the generated IP address to controller 100; and the like. It should be noted that control program 110 shown in FIG. 5 does not represent whole of the processes in controller 100, but represents part of the processes.

In the example of FIG. 5, control program 110 includes input elements IN0, IN1, function blocks FB0, FB1, and output elements OUT0, OUT1.

Values of input elements IN0, IN1 are changed in accordance with variables assigned thereto. More specifically, a variable "AutoSetting" is assigned to input element IN0. The variable "AutoSetting" is of a BOOL type, and has an initial value of "False" (=OFF). Although not shown in FIG. 5, the value of the variable "AutoSetting" is changed to "True" (=ON) based on an IP address automatic setting mode being set to ON, for example. The IP address setting mode will be described later (see FIG. 6). When the automatic IP address setting mode is set to OFF, the value of the variable "AutoSetting" becomes "False" (=OFF).

A variable "ChangeTrigger" is assigned to input element IN1. The variable "ChangeTrigger" is of the BOOL type and has an initial value of "False" (=OFF). Although not shown in FIG. 5, the value of the variable "ChangeTrigger" is changed to "True" (=ON) based on controller 100 being activated, for example. Otherwise, the value of the variable "ChangeTrigger" becomes "False" (=OFF).

A variable "Done0" is assigned to input element IN2. The variable "Done0" is of the BOOL type and has an initial value of "False" (=OFF). Moreover, the variable "Done0" is associated with an output "Done" of function block FB0. As described above, when the IP address generation process is changed normally, a signal "True" (=ON) indicating normal termination is output from the output "Done" of function block FB0. When the output "Done" of function block FB0 becomes "True" (=ON), the value of input element IN2 becomes "True" (=ON). On the other hand, when the output "Done" of function block FB0 becomes "False" (=OFF), the value of input element IN2 becomes "False" (=OFF).

Function block FB0 is a program for generating the IP address. Based on the variable "AutoSetting" becoming "True" (=ON) and the variable "ChangeTrigger" becoming "True" (=ON), a signal "True" (=ON) indicating "enable" is input into the input portion "Execute" of function block FB0. Based on this, function block FB0 performs the IP address generation process in accordance with a variable "Method0" input into the input portion "Method". Details of the IP address generation process have been described with reference to FIG. 3, and therefore will not be described repeatedly.

Function block FB1 is a program for setting an IP address to controller 100. Based on the variable "Done" becoming "True" (=ON), a signal "True" (=ON) indicating "enable" is input into the input portion "Execute" of function block FB1. Based on this, function block FB1 performs the IP address setting process in accordance with a value of a variable "IPAddress0" input into the input portion "IPAddress". Since the variable "IPAddress0" is associated with the output "IPAddress" of function block FB0, the IP address generated by function block FB0 is set by function block FB1. More specifically, function block FB1 rewrites, with the value of the variable "IPAddress0", the IP address defined in network setting 108 (see FIG. 1) of controller 100 or the IP address managed by the system variable.

When the IP address is set normally, a signal indicating normal termination is output from the output portion "Done" of function block FB1. During the setting of the IP address, a signal indicating that the setting process is being performed is output from the output portion "Busy" of function block FB1. When the IP address is not set normally, a signal indicating abnormal termination is output from the output portion "Error" of function block FB1. In this case, an error ID for identifying details of the error is further output from the output portion "ErrorID" of function block FB1.

The variable "Done1" is assigned to output element OUT1, and is associated with the output portion "Done" of function block FB1. As a result, the value of output element OUT1 is changed in accordance with the value of the output "Done" of function block FB1.

E. IP Address Setting Mode

Figure 6:
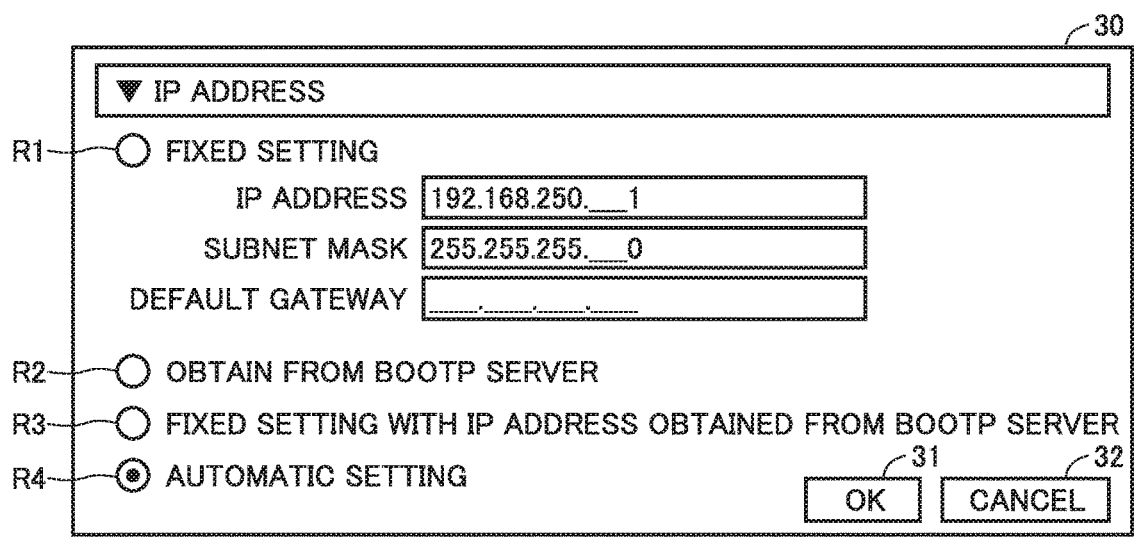
FIG. 6 shows an exemplary screen for setting an IP address setting mode.

The IP address setting mode will be described with reference to FIG. 6. FIG. 6 shows an exemplary screen for setting the IP address setting mode.

The IP address setting mode can be set on a setting screen 30 presented on support device 200A (see FIG. 2) described above, for example. Setting screen 30 includes: radio buttons R1 to R4 that each receive a selection of a setting mode;

an OK button 31; and a cancel button 32. The IP address setting mode includes a first setting mode to a fourth setting mode, for example.

When radio button R1 is selected, the IP address setting mode is set to the first setting mode. In the first setting mode, the user can designate: an IP address to be set to controller 100; a subnet mask; and an IP address of a default gateway.

When radio button R2 is selected, the IP address setting mode is set to the second setting mode. In the second setting mode, controller 100 is set to obtain an IP address from a server in accordance with a BOOTP (BOOTstrapProtocol) protocol. In the second setting mode, whenever controller 100 is activated, controller 100 dynamically sets an IP address.

When radio button R3 is selected, the IP address setting mode is set to the third setting mode. In the third setting mode, controller 100 is set to obtain an IP address from a server in accordance with the BOOTP protocol. In the third setting mode, controller 100 statically sets the IP address.

When radio button R4 is selected, the IP address setting mode is set to the fourth setting mode. In the fourth setting mode, controller 100 automatically generates an IP address and applies the IP address to controller 100 itself. The IP address automatic generation function has been described with reference to FIG. 3 and FIG. 4, and therefore will not be described repeatedly.

When OK button 31 is pressed, support device 200A saves the selected setting mode. Based on a setting mode download instruction being received, support device 200A transmits the selected setting mode to a designated controller 100. Controller 100 sets an IP address in accordance with the selected setting mode.

When cancel button 32 is pressed, support device 200A closes setting screen 30 without saving the selected setting mode.

F. Control Instruction Depending on IP Address Setting

Figure 7:
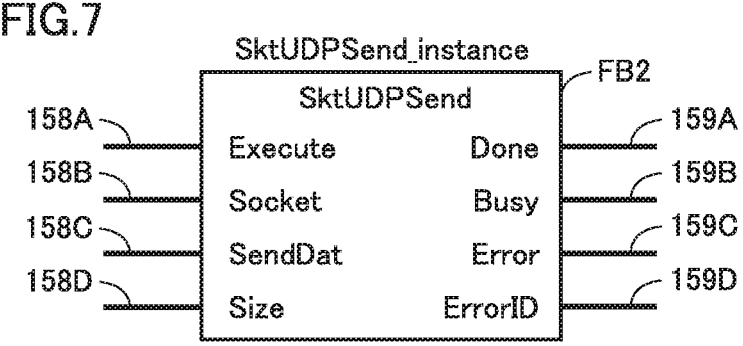
FIG. 7 shows a function block that depends on the IP address of the controller.

As described above, control program 110 (see FIG. 1) includes a control instruction depending on the IP address of its corresponding controller. With reference to FIG. 7, the following describes an exemplary control instruction depending on the IP address of the controller. FIG. 7 shows a function block FB2 depending on the IP address of the controller.

In the description below, function block FB2 will be illustratively described as an exemplary control instruction depending on the IP address of the controller; however, the control instruction is not limited to function block FB2. For example, the control instruction can include: an instruction defined by the ladder diagram; or an instruction defined by one or a combination of an instruction list, a structured text, and a sequential function chart. Moreover, the control instruction can include an instruction defined by a general-purpose programming language such as JavaScript or C language.

Function block FB2 is a program for transmitting designated data to a designated device. Function block FB2 includes: input portions 158A to 158D each for receiving a setting about a data transmission function; and output portions 159A to 159D each for outputting a result of execution of the data transmission function.

Input portion 158A shown as the "Execute" receives a setting for designating whether to perform the data transmission function. As an example, input portion 158A receives an input of "True" or "False". The data transmission function is not performed as long as "False" is input into input portion 158A. On the other hand, when "True" is input into input portion 158A, the data transmission function is performed.

Input portion 158B shown as "Socket" receives network information about a destination of transmission and an origin of transmission. As an example, the network information includes: the IP address of an information processing device 200 serving as the destination of transmission; the IP address of controller 100 serving as the origin of transmission; and the like. Thus, function block FB2 is dependent on the IP address of controller 100. Control program 110 is designed such that the above-described identifier serving as an alternative to the IP address (see FIG. 1) is written in the network information to be input into input portion 158B and the network information is input into input portion 158B.

Input portion 158C shown as "SendDat" receives, as an input, target data for transmission. Input portion 158D shown as "Size" receives, as an input, a size of the target data for transmission.

When the target data for transmission is transmitted normally, a signal indicating normal termination is output from output portion 159A shown as "Done". During transmission of the target data for transmission, a signal indicating that the transmission process is being performed is output from output portion 159B shown as "Busy". When the data to be transmitted is not generated normally, a signal indicating abnormal termination is output from output portion 159C shown as "Error". In this case, an error ID for identifying details of the error is further output from output portion 159D shown as "ErrorID".

G. IP Address Collection Function

Information processing device 200 (see FIG. 1) collects, from each low-level controller, the IP addresses generated by the above-described automatic generation function. With this collection function, the user can readily know the IP address set in each controller.

Figure 8:
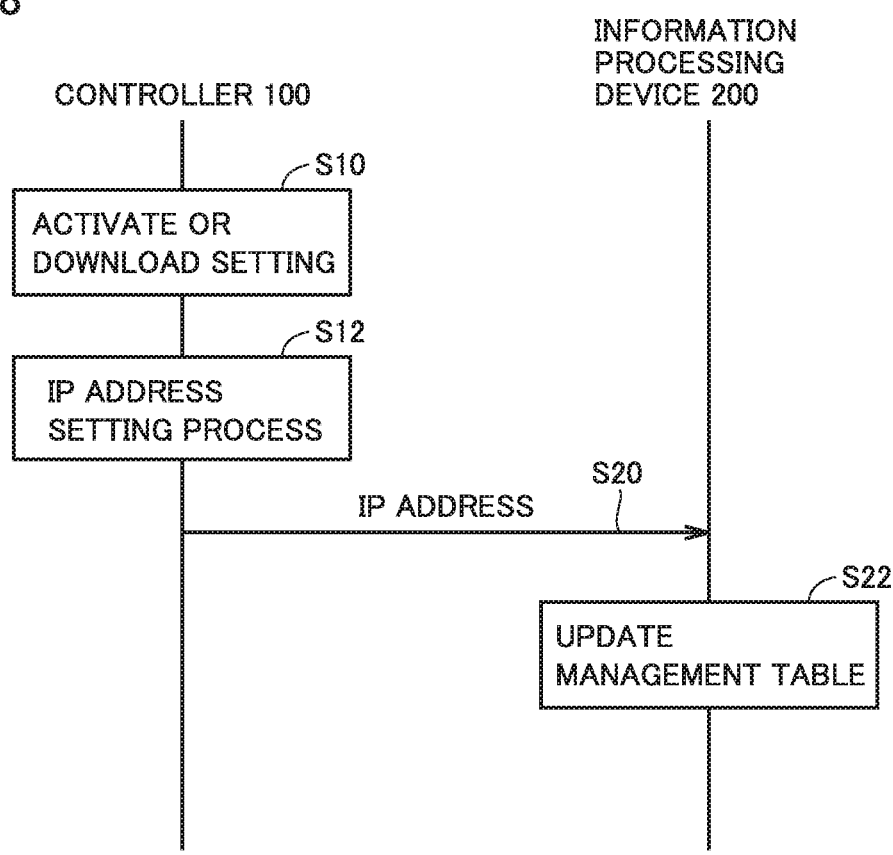
FIG. 8 is a sequence diagram showing a flow of an IP address collection function in accordance with a notification method.
Figure 10:
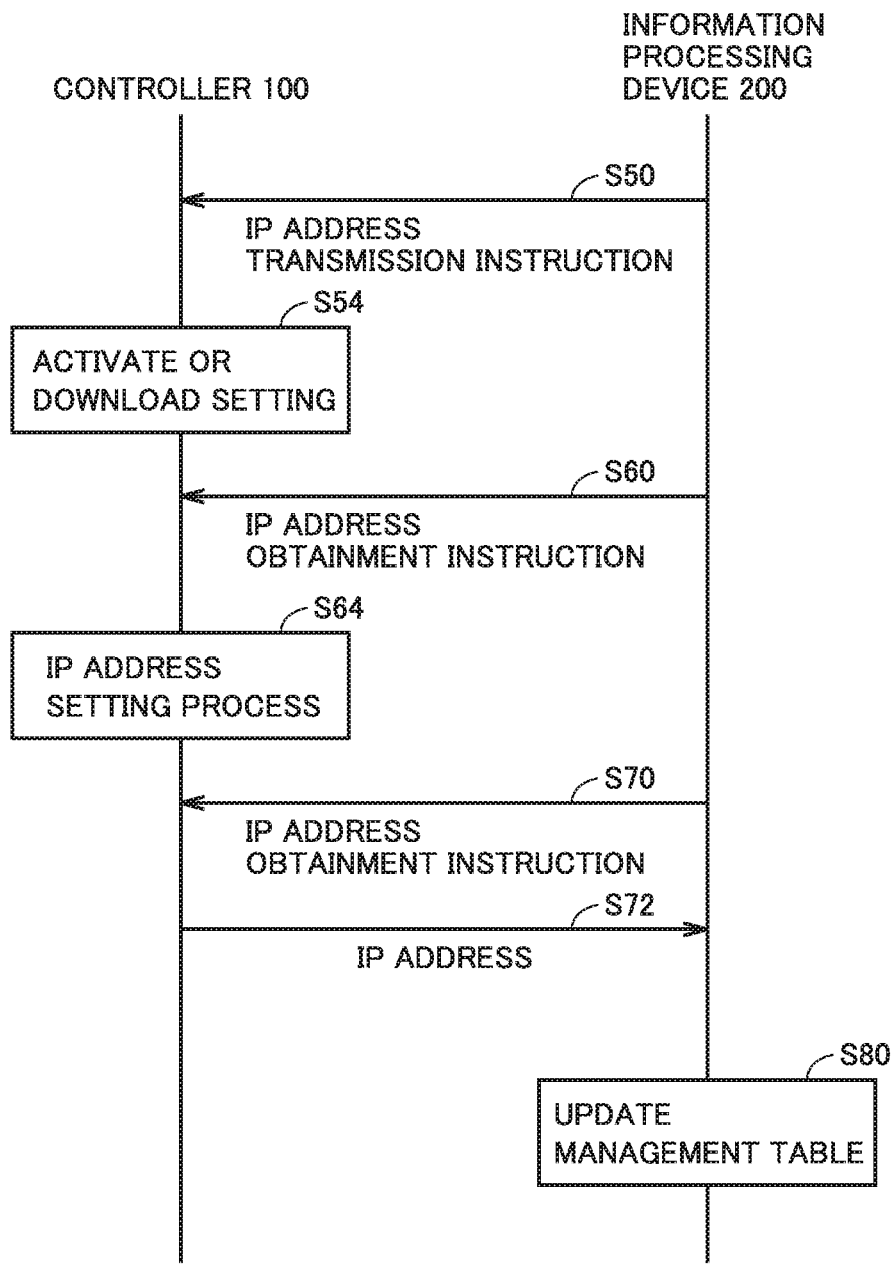
FIG. 10 is a sequence diagram showing a flow of an IP address collection function in accordance with a polling method.

For an IP address collection method, various collection methods can be employed. As an example, for the IP address collection method, one of a notification method from controller 100 and a polling method by information processing device 200 is employed. With reference to FIG. 8 to FIG. 10, the following describes the notification method and the polling method in this order.

G1. IP Address Collection Function by Notification Method

First, with reference to FIG. 8, the IP address collection function by the notification method will be described. FIG. 8 is a sequence diagram showing a flow of the IP address collection function by the notification method.

In the data collection function in this method, each controller transmits an automatically generated IP address to a high-level information processing device 200 at a timing at which the automatically generated IP address is set.

More specifically, it is assumed that controller 100 is activated in step S10. Alternatively, it is assumed that in step S10, controller 100 downloads various types of settings from support device 200A or the like. The various types of settings include: control program 110 designed by support device 200A; the setting mode set on setting screen 30 (see FIG. 6) described above; and the like.

In step S12, controller 100 performs the IP address automatic generation process. The IP address automatic generation process has been described with reference to FIG. 3 and FIG. 4, and therefore will not be described repeatedly. Controller 100 sets the generated IP address as the IP address of controller 100.

In step S20, controller 100 transmits the IP address generated in step S12 to information processing device 200. Likewise, the other controllers also transmit respective automatically generated IP addresses to information processing device 200 at respective timings at which the automatically generated IP addresses are set.

In a step S22, based on the IP address being received from controller 100, information processing device 200 updates an IP address management table. FIG. 9 shows an exemplary IP address management table. FIG. 9 shows a management table 35 as an exemplary IP address management table.

For example, management table 35 is managed in a below-described storage device 210 (see FIG. 14) of information processing device 200. In management table 35, the identification information, IP address, serial number, and model number of the controller are associated with one another. The identification information of the controller is represented by information by which the controller can be identified uniquely, such as the name or ID (Identification) of the controller.

When information about the controller serving as the origin of transmission of the IP address is not defined in management table 35, information processing device 200 adds, to management table 35, the identification information of the controller serving as the origin of transmission, the IP address of the controller serving as the origin of transmission, the serial number of the controller serving as the origin of transmission, and the model number of the controller serving as the origin of transmission. On the other hand, when the information about the controller of the origin of transmission of the IP address is already defined in management table 35, the IP address, serial number, and model number associated with the identification information of the controller serving as the origin of transmission are updated with the received IP address, serial number, and model number.

The user can present management table 35 on the display of information processing device 200 as required. Accordingly, the user can readily know the IP address set in each controller. Moreover, since the serial number, model number, and the like are presented together, the user can readily distinguish between the controllers and can readily know what IP address is set to which controller.

G2. IP Address Collection Function by Polling Method

Next, with reference to FIG. 10, the IP address collection function by the polling method will be described. FIG. 10 is a sequence diagram showing a flow of the IP address collection function by the polling method.

In the data collection function in this method, information processing device 200 regularly collects an automatically generated IP address from each controller.

More specifically, in a step S50, information processing device 200 transmits an IP address transmission instruction to each of controllers 100. The transmission instruction is regularly transmitted from information processing device 200 to controller 100.

It is assumed that at the time of step S50, the IP address of controller 100 is not set. When the IP address is not set, controller 100 makes no response to the transmission instruction received from information processing device 200.

It is assumed that controller 100 is activated in a step S54. Alternatively, it is assumed that in step S54, controller 100 downloads various types of settings from support device 200A or the like. The various types of settings include: control program 110 designed by support device 200A; the setting mode set on setting screen 30 (see FIG. 6) described above; and the like.

In a step S60, information processing device 200 transmits the IP address transmission instruction to each of controllers 100. As with step S50, since the IP address of information processing device 200 is not set at this time, controller 100 makes no response to the transmission instruction received in step S60.

In a step S64, controller 100 performs the IP address automatic generation process. The IP address automatic generation process has been described with reference to FIG. 3 and FIG. 4, and therefore will not be described repeatedly. Controller 100 sets the generated IP address as the IP address of controller 100.

In a step S70, information processing device 200 transmits an IP address transmission instruction to each of controllers 100. Since the IP address of information processing device 200 is set at this time, in a step S72, controller 100 transmits its own IP address to information processing device 200.

In a step S80, based on the IP address being received from controller 100, information processing device 200 updates IP address management table 35 (see FIG. 9). The method for updating management table 35 has been described with reference to FIG. 9 and therefore will not be described repeatedly.

H. Determined State of IP Address

Preferably, control system 1 is configured to receive an indication of whether the IP address of controller 100 is in a provisionally determined state or is in an actually determined state. Since such a determined state can be set, the user can readily know whether the IP address of each controller is in a provisionally set state or is in an actually set state.

As an example, when constructing a network environment of control system 1, the user brings the IP address of controller 100 into the provisionally determined state. Such a provisionally determined state can be employed when control system 1 is temporarily brought into a state in which control system 1 can make communication. After constructing the network environment of control system 1, the user actually sets the IP address of controller 100, thus bringing the IP address into the actually determined state.

Figure 11:
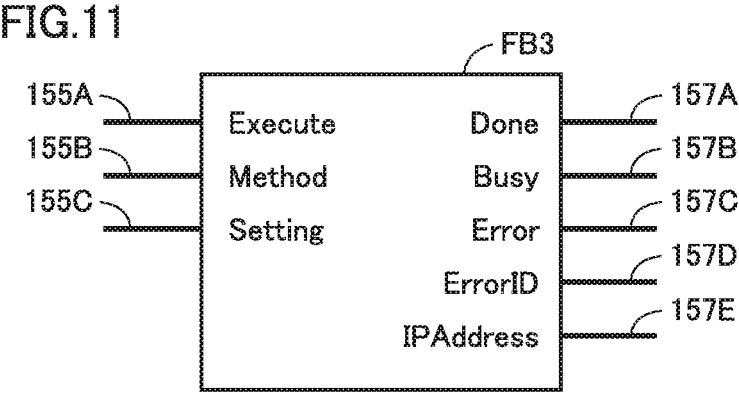
FIG. 11 shows a modification of the function block shown in FIG. 3.

With reference to FIG. 11, the following describes a method for setting a determined state of the IP address. FIG. 11 shows a modification of function block FB0 shown in FIG. 3. FIG. 11 shows a function block FB3 as the modification of function block FB0.

Function block FB3 shown in FIG. 11 is different from function block FB0 shown in FIG. 3 in that function block FB3 shown in FIG. 11 further has an input portion 155C. The other points are the same as those described above, and therefore will not be described repeatedly.

Input portion 155C shown as the "Setting" receives a setting for a determined state of the IP address. As an example, input portion 155C receives an input of "0" or "1".

When "0" is input into input portion 155C, the IP address generated by function block FB3 is set as the provisionally determined state. When "1" is input into input portion 155C, the IP address generated by function block FB3 is set as the actually determined state.

The determined state of the IP address is switched in accordance with the IP address automatic generation method, for example. As an example, when the method for generating the IP address from the identification information (for example, MAC address or the like) of controller 100 is set to input portion 155B, "0" indicating the provisionally determined state is input into input portion 155C. On the other hand, when the method for generating the IP address based on a setting value stored in an external storage device such as a memory card is set to input portion 155B, "1" indicating the actually determined state is input into input portion 155C.

Figure 12:
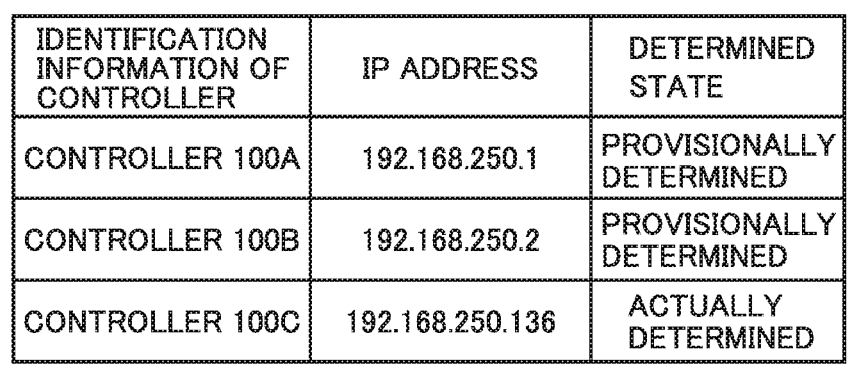
FIG. 12 shows a modification of the management table shown in FIG. 9.

FIG. 12 shows a modification of management table 35 shown in FIG. 9. A management table 35A is shown as the modification in FIG. 12.

For example, management table 35A is managed in a below-described storage device 210 (see FIG. 14) of information processing device 200. In management table 35A, the identification information, IP address, and determined state of the IP address of the controller are associated with one another. The identification information of the controller is represented by information by which the controller can be identified uniquely, such as the name or ID of the controller.

The user can present management table 35A on the display of information processing device 200 as required. Accordingly, the user can readily know the determined state of the IP address set in each controller.

I. Hardware Configuration of Controller 100

Figure 13:
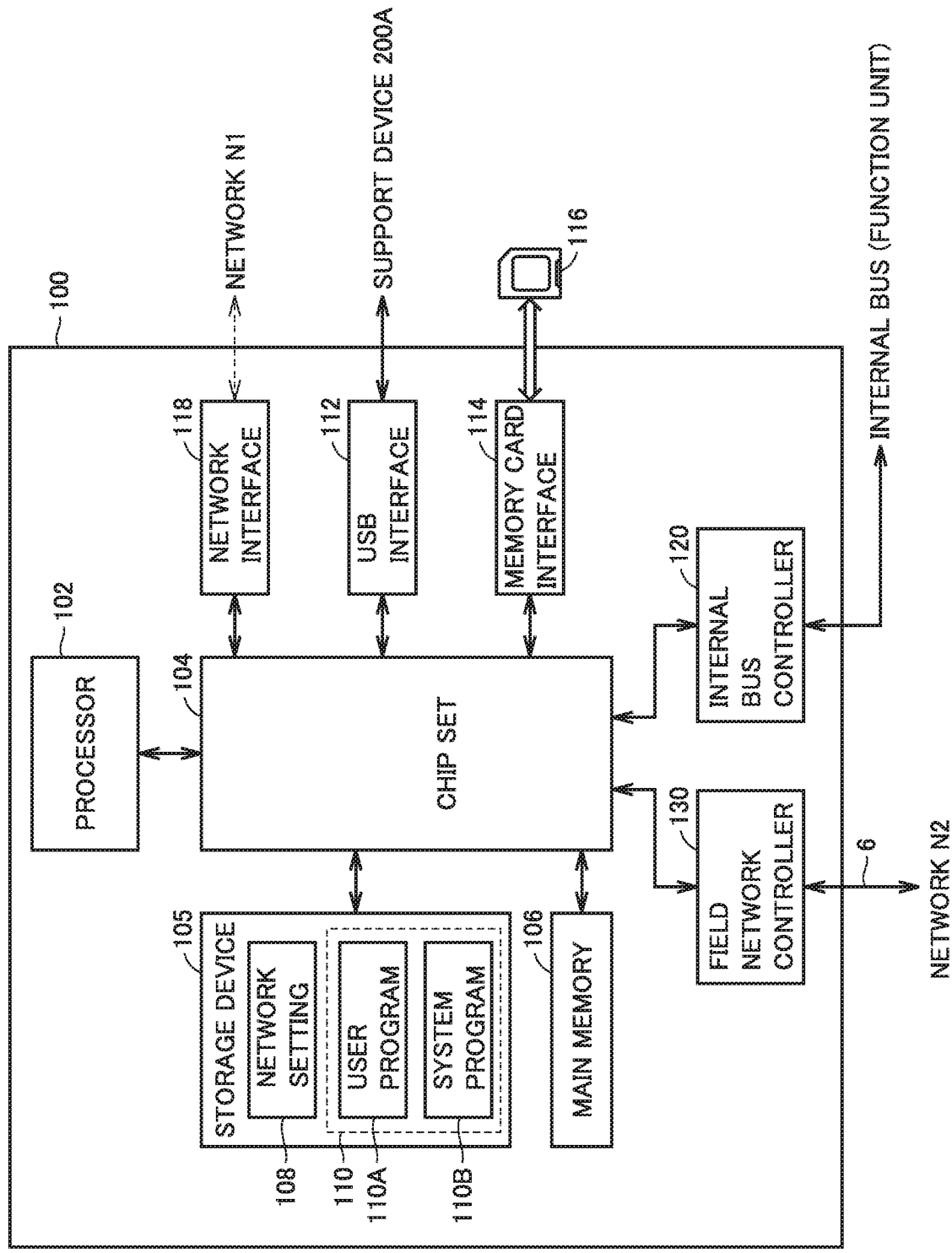
FIG. 13 is a block diagram showing an exemplary hardware configuration of the controller according to the embodiment.

FIG. 13 is a block diagram showing an exemplary hardware configuration of controller 100. With reference to FIG. 13, controller 100 incudes a processor 102, a chip set 104, a storage device 105, a main memory 106, and a USB (Universal Serial Bus) interface 112, a memory card interface 114, a network interface 118, an internal bus controller 120, and a field network controller 130.

Processor 102 is constituted of a CPU (Central Processing Unit), an MPU (Micro Processing Unit), a GPU (Graphics Processing Unit), or the like. As processor 102, a configuration having a plurality of cores may be employed or a plurality of processors 102 may be disposed. Thus, controller 100 has one or more processors 102 and/or a processor 102 having one or more cores. Chip set 104 implements a process as a whole of controller 100 by controlling processor 102 and peripheral elements. Main memory 106 is constituted of a volatile storage device, such as a DRAM (Dynamic Random Access Memory) or a SRAM (Static Random Access Memory). Storage device 105 is constituted of a nonvolatile storage device such as a flash memory, for example.

Processor 102 reads the various types of programs stored in storage device 105, expands them in main memory 106, and executes them, thereby implementing control for a control target. Storage device 105 stores network setting 108 and control program 110 for controller 100. Control program 110 includes not only a system program 111B for implementing a basic process, but also a user program 110A created for a manufacturing apparatus or facility serving as a control target.

USB interface 112 intermediates data communication with an external device (for example, a support device for development of the user program or the like) via USB connection.

A memory card 116 is attachable to and detachable from memory card interface 114. Memory card interface 114 can write data in memory card 116, and can read various types of data (the user program, trace data, and the like) from memory card 116.

Network interface 118 can intermediate data communication via network N1.

Internal bus controller 120 intermediates data communication with a function unit attached to controller 100. Field network controller 130 intermediates data communication with another unit via network N2.

FIG. 13 shows an exemplary configuration in which required processes are implemented by processor 102 executing programs; however, part or whole of the provided processes may be implemented using a dedicated hardware circuit (for example, an ASIC (Application Specific Integrated Circuit), an FPGA (Field Programmable Gate Array), or the like).

J. Hardware Configuration of Information Processing Device 200

Figure 14:
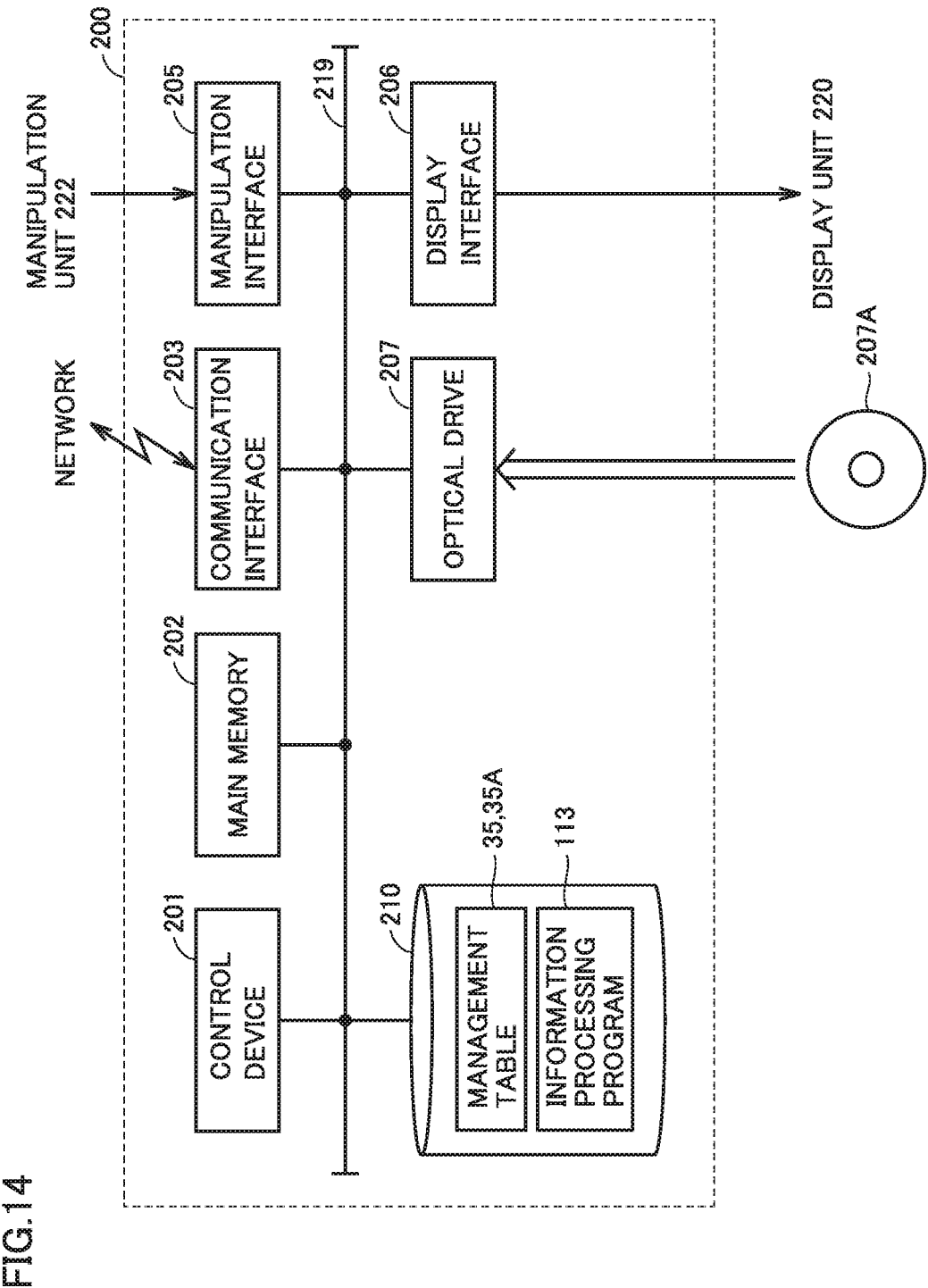
FIG. 14 is a schematic view showing a hardware configuration of an information processing device according to the embodiment.

With reference to FIG. 14, the hardware configuration of information processing device 200 will be described. FIG. 14 is a schematic view showing the hardware configuration of information processing device 200.

As an example, information processing device 200 is constituted of a computer configured in accordance with a general-purpose computer architecture. Information processing device 200 includes a control device 201, a main memory 202, a communication interface 203, a manipulation interface 205, a display interface 206, an optical drive 207, and a storage device 210. These components are communicatively connected to one another through internal bus 219.

Control device 201 is constituted of at least one integrated circuit, for example. The integrated circuit is constituted of at least one CPU, at least one ASIC, at least one FPGA, or a combination of those, for example. Control device 201 expands a program in main memory 202 and executes it, thereby implementing various types of processes such as the above-described IP address collection function. Main memory 202 is constituted of a volatile memory, and functions as a work memory required to execute a program by control device 201.

Communication interface 203 exchanges data with an external device through a network. Examples of the external device include controller 100, a server, other communication devices, and the like. Information processing device 200 may be configured to download an information processing program 213 through communication interface 203. Information processing program 213 is a program for providing an integrated development environment for control program 110 described above.

Manipulation interface 205 is connected to manipulation unit 222, and receives a signal indicating a user's manipulation from manipulation unit 222. Typically, manipulation unit 222 is constituted of a keyboard, a mouse, a touch panel, a touchpad, and/or the like, and receives a manipulation from the user.

Display interface 206 is connected to display unit 220, and sends to display unit 220 an image signal for presenting an image, in accordance with a command from control device 201 or the like. Display unit 220 is constituted of a display, an indicator, or the like, and presents various types of information to the user.

Optical drive 207 reads, from optical disk 207A or the like, various types of programs stored therein, and installs them into storage device 210.

FIG. 14 shows an exemplary configuration in which a required program is installed into information processing device 200 through optical drive 207; however, the configuration is limited to this. The required program may be downloaded from a server device or the like on a network. Alternatively, the program on information processing device 200 may be rewritten by a program written in a storage medium such as a USB (Universal Serial Bus) memory, an SD (Secure Digital) card, or a CF (Compact Flash).

Storage device 210 is a hard disk or an external storage medium, for example. As an example, storage device 210 stores management tables 35, 35A and information processing program 213. It should be noted that management tables 35, 35A do not necessarily need to be stored in storage device 210, and may be stored in another storage device. As an example, management tables 35, 35A may be stored in main memory 202 or an external storage medium (for example, a memory card, a server, or the like).

K. Conclusion

As described above, control program 110 includes a control instruction depending on an IP address. The control instruction controls a drive device 300 serving as a control target with an identifier indicated in network setting 108 of controller 100 being an input. The identifier serves as an alternative to the IP address of the controller, and is the same among the controllers. With such an identifier being an input, the user does not need to rewrite control program 110 even when the IP address is changed. Accordingly, a currently used control program can be used in another controller, thus facilitating scaling-up of a facility.

Moreover, controller 100 generates an IP address of controller 100 to be different from the IP address(es) of the other controller(s). Accordingly, the user can readily construct an environment allowing for communication, even when scaling up a facility.

L. Additional Description

As described above, the present embodiment includes the following disclosure.

[Configuration 1]

A control system comprising:
a plurality of controllers (100A, 100B, 100C) that each control a drive device (300) serving as a control target; and
an information processing device (200) connected to the same network as a network to which each of the plurality of controllers (100A, 100B, 100C) is connected, wherein
each of the plurality of controllers (100A, 100B, 100C) includes a storage device (105) that stores a network setting (108) and a control program (110) for controlling the drive device (300) serving as the control target, the network setting (108) including a corresponding relation between an IP (Internet Protocol) address of the controller and an identifier serving as an alternative to the IP address,
the control program (110) includes a control instruction for controlling the drive device (300) serving as the control target with the identifier indicated in the network setting (108) of the controller being an input, each of the plurality of controllers (100A, 100B, 100C) further includes
a generation module (152) that generates an IP address of the controller to be different from an IP address of an other controller and that rewrites, with the generated IP address, the IP address indicated in the network setting (108) of the controller, and
a communication module (154) that communicates with the information processing device (200) in accordance with the IP address indicated in the network setting (108) of the controller.

[Configuration 2]
The control system according to configuration 1, wherein the generation module (152) generates the IP address of the controller based on identification information that is able to uniquely identify the controller.

[Configuration 3]
The control system according to configuration 1 or 2, wherein
each of the plurality of controllers (100A, 100B, 100C) is connectable to an external storage medium,
the external storage medium stores a setting value about an IP address, and
the generation module (152) reads the setting value stored in the external storage medium, and generates the IP address of the controller in accordance with the setting value.

[Configuration 4]
The control system according to any one of configurations 1 to 3, wherein
the generation module (152) makes an inquiry to the other controller about whether or not the generated IP address is already used by the other controller, and
when there is no other controller that makes a response to the inquiry, the generation module (152) rewrites the IP address indicated in the network setting (108) of the controller with the generated IP address.

[Configuration 5]
The control system according to configuration 4, wherein when there is any other controller that makes a response to the inquiry, the generation module (152) regenerates an IP address different from the IP address generated previously.

[Configuration 6]
The control system according to configuration 4 or 5, wherein when the other controller makes an inquiry about whether or not the IP address of the other controller is already set in the controller, the generation module (152) generates the IP address of the controller so as not to be the same as the IP address of the other controller.

[Configuration 7]
The control system according to any one of configurations 1 to 6, wherein the control program (110) stored in the controller is a duplicate of a control program (110) stored in an other controller.

[Configuration 8]
A controller (100A) for controlling a drive device (300), the controller (100A) comprising:
a storage device (105) that stores a network setting (108) and a control program (110) for controlling the drive device (300), the network setting (108) including a corresponding relation between an IP address of the controller (100A) and an identifier serving as an alternative to the IP address, the control program (110) including a control instruction for controlling the drive device (300) with the identifier indicated in the network setting (108) being an input;
a generation module (152) that generates an IP address of the controller (100A) to be different from an IP address of an other controller (100B, 100C) connected to the same network as a network to which the controller (100A) is connected and that rewrites, with the generated IP address, the IP address indicated in the network setting (108); and a communication module (154) that communicates, in accordance with the IP address indicated in the network setting (108), with an information processing device (200) connected to the same network as the network to which the controller (100A) is connected.

[Configuration 9]

A method for controlling a controller (100A) for controlling a drive device (300), the method comprising:

obtaining, from a storage device of the controller (100A), a network setting (108) and a control program (110) for controlling the drive device (300), the network setting (108) including a corresponding relation between an IP address of the controller (100A) and an identifier serving as an alternative to the IP address, the control program (110) including a control instruction for controlling the drive device (300) with the identifier indicated in the network setting (108) being an input;

generating an IP address of the controller (100A) to be different from an IP address of an other controller (100B, 100C) connected to the same network as a network to which the controller (100A) is connected, and rewriting, with the generated IP address, the IP address indicated in the network setting (108); and communicating, in accordance with the IP address indicated in the network setting (108), with an information processing device (200) connected to the same network as the network to which the controller (100A) is connected.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: control system; 30: setting screen; 31: OK button; 32: cancel button; 35, 35A: management table; 100, 100A, 100B, 100C: controller; 102: processor; 104: chip set; 105, 210: storage device; 106, 202: main memory; 108: network setting; 110: control program; 110A: user program; 111B: system program; 112: USB interface; 114: memory card interface; 116: memory card; 118: network interface; 120: internal bus controller; 130: field network controller; 150: hub; 152: generation module; 154: communication module; 155A, 155B, 155C, 158A, 158B, 158C, 158D: input portion; 157A, 157B, 157C, 157D, 157E, 159A, 159B, 159C, 159D: output portion; 200: information processing device; 200A: support device; 200B: server device; 200C: indicator; 201: control device; 203: communication interface; 205: manipulation interface; 206: display interface; 207: optical drive; 207A: optical disk; 213: information processing program; 219: internal bus; 220: display unit; 222: manipulation unit; 300: drive device; 325: arm robot.

The invention claimed is:

1. A control system comprising:
a plurality of controllers that each control a drive device serving as a control target; and
an information processing device connected to the same network as a network to which each of the plurality of controllers is connected, wherein
each of the plurality of controllers includes a storage medium that stores a network setting and a control program for controlling the drive device serving as the control target, the network setting including a corresponding relation between an IP (Internet Protocol) address of the controller and an identifier serving as an alternative to the IP address, wherein the identifier is the same between the plurality of controllers,
the control program includes a control instruction for controlling the drive device serving as the control target with the identifier indicated in the network setting of the controller as an input,
each of the plurality of controllers further includes
a processor configured with a program to perform operations comprising generating an IP address of the controller, different from an IP address of another controller, and rewriting, with the generated IP address, the IP address indicated in the network setting of the controller, and
a network interface that communicates with the information processing device in accordance with the IP address indicated in the network setting of the controller.

2. The control system according to claim 1, wherein the processor is configured with the program to generate the IP address of the controller based on identification information that to uniquely identify the controller.

3. The control system according to claim 1, wherein
each of the plurality of controllers is connectable to an external storage medium,
the external storage medium stores a setting value about an IP address, and
the processor is configured with the program to perform operations further comprising reading the setting value stored in the external storage medium, and generating the IP address of the controller in accordance with the setting value.

4. The control system according to claim 1, wherein
the processor is configured with the program to perform operations further comprising making an inquiry to the other controller about whether or not the generated IP address is already used by the other controller, and
when there is no other controller that makes a response to the inquiry, the processor is configured with the program to perform operations further comprising rewriting the IP address indicated in the network setting of the controller with the generated IP address.

5. The control system according to claim 4, wherein the processor is configured with the program to perform operations further comprising, when there is any other controller that makes a response to the inquiry, regenerating an IP address different from the IP address generated previously.

6. The control system according to claim 4, wherein the processor is configured with the program to perform operations further comprising, when the other controller makes an inquiry about whether or not the IP address of the other controller is already set in the controller, generating the IP address of the controller so as not to be the same as the IP address of the other controller.

7. The control system according to claim 1, wherein the control program stored in the storage medium of the controller comprises a duplicate of a control program stored in another controller.

8. A controller, among a plurality of controllers, for controlling a drive device, the controller comprising:
a storage medium that stores a network setting and a control program for controlling the drive device, the network setting including an IP address of the controller and an identifier serving as an alternative to the IP address, wherein the identifier is the same between the plurality of controllers, the control program including a control instruction for controlling the drive device with the identifier indicated in the network setting as an input;

a processor configured with a program to perform operations comprising generating an IP address of the controller, different from an IP address of another controller connected to the same network as a network to which the controller is connected, and rewriting, with the generated IP address, the IP address indicated in the network setting; and a network interface that communicates, in accordance with the IP address indicated in the network setting of the controller, with an information processing device connected to the same network as the network to which the controller is connected.

9. A method for controlling a controller, among a plurality of controllers, for controlling a drive device, the method comprising:

obtaining, from a storage medium of the controller, a network setting and a control program for controlling the drive device, the network setting including a corresponding relation between an IP address of the controller and an identifier serving as an alternative to the IP address, wherein the identifier is the same between the plurality of controllers, the control program including a control instruction for controlling the drive device with the identifier indicated in the network setting as an input;

generating an IP address of the controller to be different from an IP address of another controller connected to the same network as a network to which the controller is connected, and rewriting, with the generated IP address, the IP address indicated in the network setting; and communicating, in accordance with the IP address indicated in the network setting, with an information processing device connected to the same network as the network to which the controller is connected.

* * * * *